J. HOPKINSON.
KNIFE GUARD FOR MEAT SLICING MACHINES.
APPLICATION FILED DEC. 17, 1919.
1,361,998.
Patented Dec. 14, 1920.
*Fig. 1,*
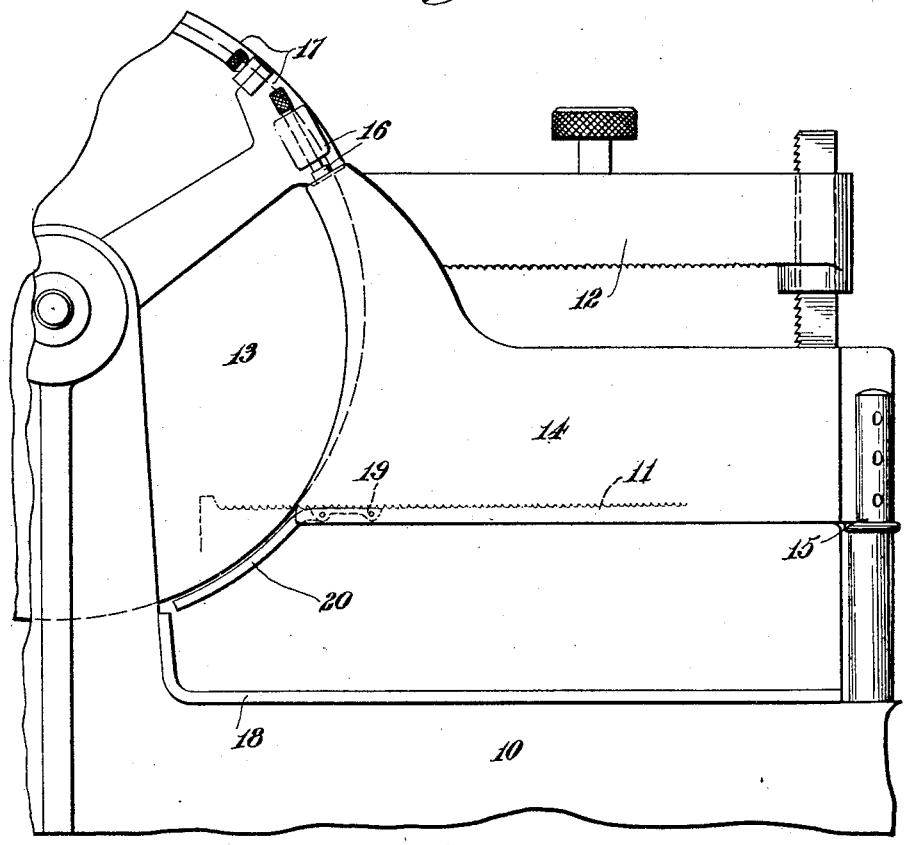
*Fig. 2,*
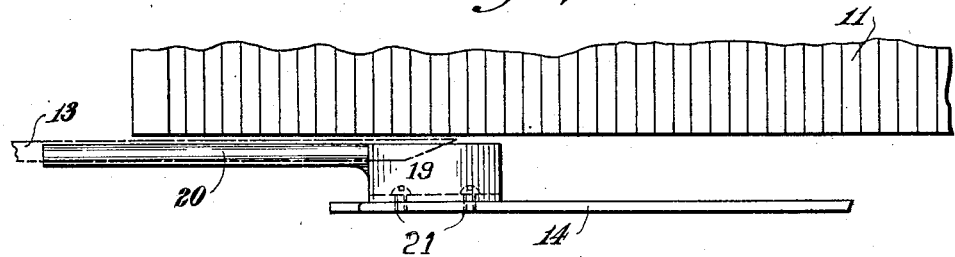
Inventor
Joseph Hopkinson
By his Attorneys
Kerr Page Cooper & Hayward

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

KNIFE-GUARD FOR MEAT-SLICING MACHINES.

1,361,998.  Specification of Letters Patent.  Patented Dec. 14, 1920.

Application filed December 17, 1919. Serial No. 345,615.

*To all whom it may concern:*

Be it known that I, JOSEPH HOPKINSON, a citizen of the United States, residing at Dayton, Montgomery county, and State of Ohio, have invented certain new and useful Improvements in Knife-Guards for Meat-Slicing Machines, of which the following is a full, clear, and exact description.

This invention relates to improvements in the knife guard shown, described and claimed in patent to Hopkinson and Maltby No. 1,210,476. In this patent is shown a pivoted plate guard having a portion projecting therefrom to form a support for the meat being cut. In order to guard the periphery of the cutting knife below the plate there has been provided a shield shown in patent to Hopkinson and Thomas No. 1,763,414 and forming a part of the tray to receive the sliced meat.

It is among the objects of the present invention to eliminate that portion of the shield which extended up adjacent the knife and to provide a supplementary guard which is attached to the main plate guard and which also has integral therewith a meat supporting member. The improved construction facilitates the cleaning of the knife and also obviates the objectionable feature of the former construction of particles of meat collecting behind the shield and becoming rancid. At the same time the knife is so guarded that accidents are avoided.

In the drawings:

Figure 1 shows a side view of a meat slicer having my improved supplementary guard.

Fig. 2 is a top plan view of the same.

The machine is of the well known type comprising a base 10, meat plate 11, meat clamp 12, circular concavo convex knife 13; a displaceable plate guard 14 is pivoted to the base at 15 and extends slightly within the periphery of the knife and to one side as shown in the drawings. The plate guard is provided with the usual catch 16 coöperating with circular guard 17. A suitable tray 18 is mounted upon the base and receives the slices of meat as they are cut off by the knife.

Fastened to displaceable plate guard 14 and extending toward the meat plate 11 is a meat support 19 having integral therewith a supplementary guard 20. This guard extends downwardly and rearwardly and is concentric with the periphery of the knife. The guard is preferably circular in cross section and is located without the periphery of the knife as shown in Fig. 1 and extends slightly to the side thereof as shown in Fig. 2. The end of the guard terminates adjacent the rear end of the meat tray as shown in Fig. 1.

Inasmuch as both meat support 19 and guard 20 are integral and fastened to the plate guard by screws 21, these parts will be displaceable away from the knife when the displaceable plate guard itself is swung away. It is therefore a simple matter to clean both knife and guard parts and the collection of meat particles is largely avoided inasmuch as plate shields extending up adjacent the knife are eliminated.

The guard 20 being without the periphery of the knife and extending along at one side thereof effectually guards the knife and prevents accidents to the operator.

What I claim is:

1. In a device of the class described adapted to guard a rotary knife comprising in combination, a plate like knife guard supported upon a vertically extending pivot disposed remote from the knife, said vertical pivot mounting permitting said plate like guard to be swung about the pivot laterally away from guarding position adjacent the knife for cleaning, and a supplementary guard fastened to the plate like guard and displaceable therewith, said supplementary guard extending adjacent the periphery of the rotary knife and to one side thereof to guard the portion of the knife periphery below the lower edge of the plate like guard.

2. In a device of the class described, in combination, a rotary knife, a displaceable knife guard, a meat support fastened thereto and displaceable therewith, a supplementary guard fastened to said guard and displaceable therewith, said guard being adapted to guard the portion of the knife below the first mentioned guard.

3. In a device of the class described, in combination, a circular knife, a plate guard therefor, a meat support fastened thereto, and a supplementary guard integral with said meat support and adapted to guard the portion of the knife below the plate guard.

4. In a device of the class described, in combination, a circular knife, a displaceable plate guard therefor, a combined meat support and supplementary knife guard fastened to said displaceable plate guard, and displaceable therewith, said supplementary knife guard extending at a point without the periphery of the circular knife and at one side thereof, and being adapted to guard that portion of the knife which is below the displaceable plate guard.

5. In a device of the class described, in combination, a rotary knife, a displaceable knife guard, a supplementary guard fastened to the first mentioned guard, said guard extending without the periphery of the rotary knife and to one side thereof to guard the portion of the periphery below the lower edge of the displaceable guard, and a pivot support for both the displaceable and supplementary guard, said support having provision to permit the said parts to be displaced away from the knife for cleaning by a single swinging movement about said pivot support.

In testimony whereof I herewith affix my signature.

JOSEPH HOPKINSON.